United States Patent [19]

Koo et al.

[11] Patent Number: 5,432,855
[45] Date of Patent: Jul. 11, 1995

[54] STEREO AND DUAL AUDIO SIGNAL IDENTIFYING SYSTEM

[75] Inventors: Seung-yup Koo, Seoul; Duck-young Jung, Incheon, both of Rep. of Korea

[73] Assignee: Samsung Electronics Co., Ltd., Kyungki-do, Rep. of Korea

[21] Appl. No.: 206,183

[22] Filed: Mar. 7, 1994

[30] Foreign Application Priority Data

Mar. 12, 1993 [KR] Rep. of Korea ............... 03-3753

[51] Int. Cl.6 .................. H04H 5/00; H03L 7/00; H04R 5/00; H04B 1/06
[52] U.S. Cl. .......................... 381/12; 331/25; 381/1; 455/260
[58] Field of Search ............ 381/12, 2, 1, 21, 22, 381/17, 10; 455/142, 143, 144, 260, 157.1, 157.2; 331/20, 25

[56] References Cited

U.S. PATENT DOCUMENTS

| | | | |
|---|---|---|---|
| 4,404,432 | 9/1983 | Kusakabe | 381/2 |
| 4,602,379 | 7/1986 | Ecklund | 381/12 |
| 4,970,474 | 11/1990 | Kennedy et al. | 455/260 |
| 5,179,729 | 1/1993 | Mishima et al. | 455/260 |
| 5,210,796 | 5/1993 | Hirabayashi et al. | 381/12 |

*Primary Examiner*—Curtis Kuntz
*Assistant Examiner*—Xu Mei
*Attorney, Agent, or Firm*—Stephen R. Whitt; Robert A. Westerlund; Charles R. Donohoe

[57] ABSTRACT

A stereo and dual audio signal identifying system comprising, an FM detector, bandpass filter, and AM detector which generate a filter/detected input to a first PLL having a 210 Hz reference signal. The first PLL generates a first input to a comparator and a second PLL generates a second input to the comparator. The comparator generates an output signal indicative of the presence of stereo and dual audio signals.

2 Claims, 2 Drawing Sheets

STEREO AND DUAL AUDIO SIGNAL IDENTIFYING SYSTEM

BACKGROUND OF THE INVENTION

The present invention relates to a system for identifying stereo and dual audio signals according to the broadcast method used to transmit the audio signals. In particular, the present invention identifies stereo and dual audio signals which are broadcast using two carrier frequencies.

Conventional circuits for identifying stereo and dual audio signals are complicated. Accordingly, conventional circuits occupy an unacceptably large amount of space when integrated within a semiconductor chip. Earlier attempts to simplify the structure and function of circuits identifying stereo and dual audio signals in order to reduce the amount of required chip space have resulted in unreliable circuit performance.

The circuit block diagram shown in FIG. 1 is exemplary of conventional stereo and dual audio identifying circuits. The circuit in FIG. 1 is characterized by the presence of two phase detectors and two associated 90° phase shifters. In FIG. 1, a second intermediate frequency (IF) signal is applied to an FM detector 10. The FM-detected output from FM detector 10 is then applied to an AM detector 12 through bandpass filter 11. AM detector 12 detects the envelope of the bandpass filtered signal, and applies the result to first inputs of phase comparators 13 and 18, and to phase detectors 17 and 22. Reference signals from voltage-controlled oscillators (VCOs) 15 and 20 are respectively applied to second inputs of phase comparators 13 and 18. The VCO reference signals are also respectively applied to second inputs of phase detectors 17 and 22 through 90° phase shifters 16 and 21.

VCO 15 is driven by the output of phase comparator 13 which is filtered by low-pass filter 14 before being applied to VCO 15. Similarly, VCO 20 is driven by the output of phase comparator 18 which is filtered by low-pass filter 19. Typically, VCO 15 generates a frequency of 150 Hz, and VCO 20 generates a frequency of 276 Hz to match the synchronization frequencies of the stereo and dual audio signals.

The outputs of phase detectors 17 and 22 are applied to comparator 23 as first and second inputs respectively. The output of comparator 23 serves as a mode select signal which discriminates between two frequencies used in the broadcast format for the stereo and dual audio signals.

This conventional circuit generally performs well, but the number, type and required arrangement of the numerous subcircuits makes compact integration impossible. Given the increasing requirements for miniaturization, the large chip space requirements of the conventional circuit are unacceptable.

SUMMARY OF THE INVENTION

It is therefore an object of the present invention to provide a stereo and dual audio signal identifying system having a simplified circuit configuration which allow compact integration. This object is accomplished by the stereo and dual audio signal identifying circuit of the present invention which includes; an FM detector receiving a second intermediate frequency signal, detecting an FM waveform, and generating an FM-detected output, a bandpass filter receiving and filtering the FM-detected output according to a predetermined bandpass frequency, and generating a filtered output, an AM detector receiving the filtered output, detecting an AM waveform, and generating an AM-detected output, a first phase-locked-loop locking phase between the AM-detected output and a signal having a first predetermined frequency to generating a first comparator input, a second phase-locked-loop locking phase between an externally generated reference signal and a signal having a second predetermined frequency to generate a second comparator input, and a comparator receiving the first and second comparator inputs, comparing magnitudes between the first and second comparator inputs, and generating an output signal indicative of the presence of stereo and dual audio signals in the second intermediate signal as a result of the comparison.

BRIEF DESCRIPTION OF THE DRAWINGS

The above object and other advantages of the present invention will become more apparent upon consideration of a preferred embodiment of the present invention with reference to the attached drawings in which.

DETAILED DESCRIPTION OF THE INVENTION

Figure 1:
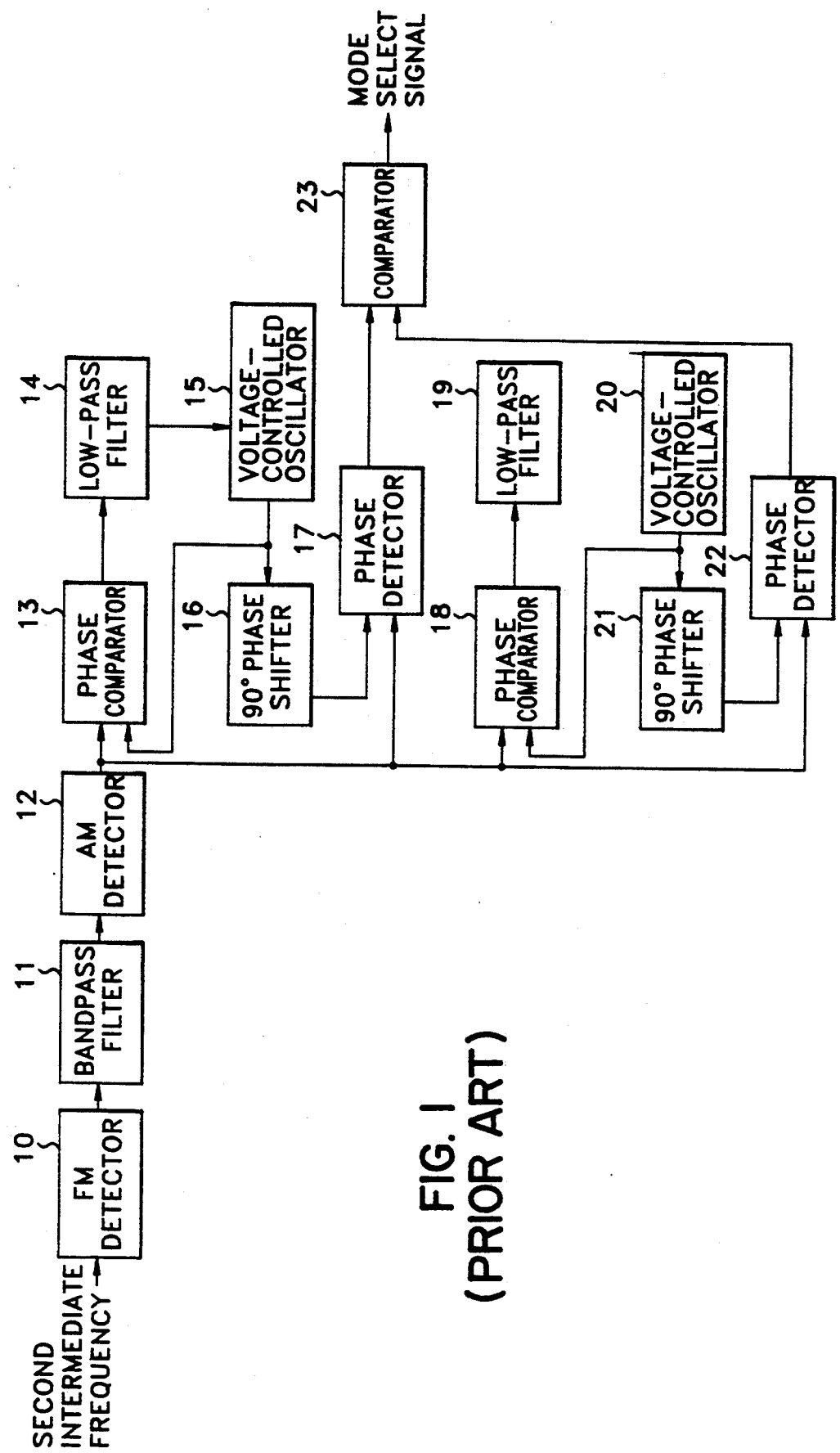
FIG. 1 is a block diagram of a conventional stereo/dual audio signal identifying circuit; and, FIG. 2 is a block diagram of a stereo/dual audio signal identifying circuit according to the present invention.
Figure 2:
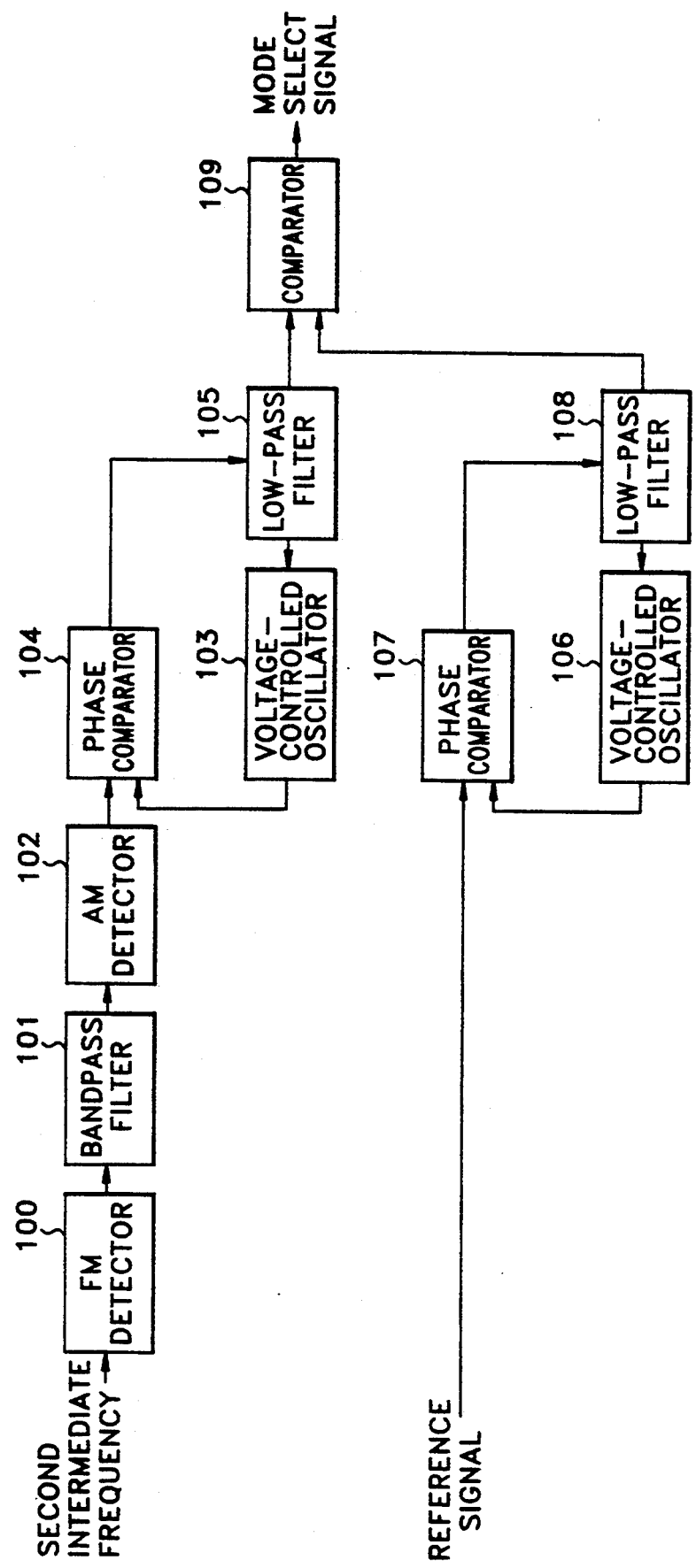

In FIG. 2, a second IF signal is applied to FM detector 100, bandpass filter 101, and AM detector 102 is a manner similar to the conventional circuit of FIG. 1. However, the output of AM detector 102 is applied only to first phase comparator 104 as a first input. First phase comparator 104 drives first VCO 103 through first low-pass filter 105. The output from first VCO 103 is applied to first phase comparator 104 as a second input. Besides driving first VCO 103, the output of first low-pass filter 105 is applied to comparator 109 as a first input.

In conjunction with the foregoing first phase-lock-loop (PLL) circuit, a second PLL circuit generates an output which is applied to comparator 109 as a second input. This second PLL includes second phase comparator 107 which receives a reference signal as a first input. Second phase comparator 107 drives second VCO 106 through second low-pass filter 108. The output of second VCO 106 is applied to second phase comparator 107 as a second input. Besides driving second VCO 106, the output of second low-pass filter 108 is applied to comparator 109 as a second input. The resulting comparative output between first and second input to comparator 109 serves as a mode select signal.

In operation, the second IF input is FM detected, band pass filtered, and AM detected before being applied to first phase comparator 104. Phase comparator 104 compares this first input with an output from VCO 103 which preferably generates a signal at 210 Hz. First low-pass filter 105 removes high frequency components of the first phase comparator output and applies this result to first VCO 103 and comparator 109. By performing this operation, 210 Hz synchronization is matched. In the second PLL, the references signal has a frequency of 210 Hz. Second VCO 106 generates an output having a predetermined frequency.

Comparator 109 compares the outputs from low-pass filters 105 and 108 and generates a confirmation signal indicating the presence of a stereo or dual audio signal. In other words, since the DC level of the second IF output is variable according to a reference DC level as synchronized to a 210 Hz signal, stereo/dual audio signals can be identified.

This foregoing circuit configuration does not require an external regulating circuit because a constant DC level for the reference VCO is maintained by the PLL arrangement. That is, by using a reference signal and PLL the present invention eliminates a considerable number of circuit elements present in the conventional stereo/dual audio signal identifying circuit. The resulting circuit can be integrated within a much smaller chip space without the operational limited of reduced circuits.

Those of ordinary skill will recognize that the embodiment described above is exemplary, and subject to routine design changes. Such changes lie within the scope of the appended claims which define the subject matter applicant regards as his invention.

What is claimed is:

1. A stereo and dual audio signal identifying system comprising;

an FM detector receiving a second intermediate frequency signal, detecting an FM waveform, and generating an FM-detected output;

a bandpass filter receiving and filtering according to a predetermined bandpass said FM-detected output, and generating a filtered output;

an AM detector receiving said filtered output, detecting an AM waveform, and generating an AM-detected output;

a first phase-locked-loop locking phase between said AM-detected output and a signal having a first predetermined frequency to generate a first comparator input;

a second phase-locked-loop locking phase between an externally generated reference signal and a signal having a second predetermined frequency to generate a second comparator input; and, a comparator receiving said first and second comparator inputs, comparing magnitudes between the first and second comparator inputs, and generating an output signal indicative of the presence of stereo and dual audio signals in said second intermediate signal as a result of said comparison.

2. The stereo and dual audio signal identifying system of claim 1, wherein said first predetermined frequency is 210 Hz.

* * * * *